No. 675,781. Patented June 4, 1901.
W. D. MACDONALD.
PHOTOGRAPHIC CAMERA.
(Application filed Aug. 20, 1900.)
(No Model.)
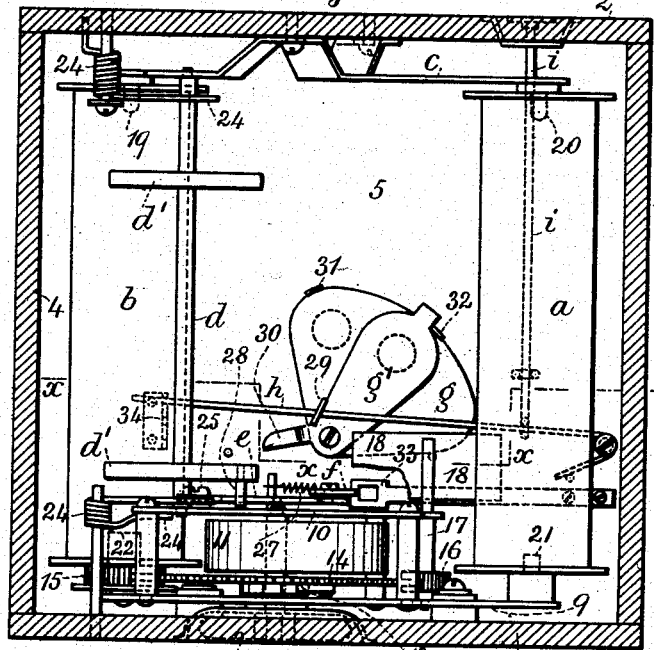
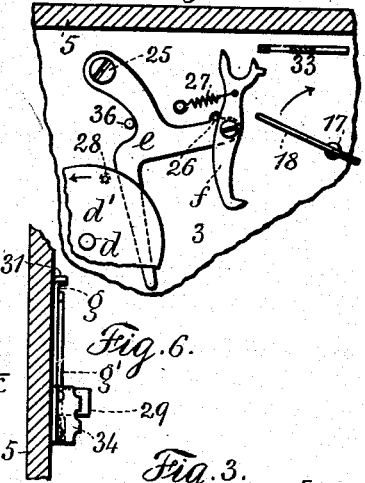
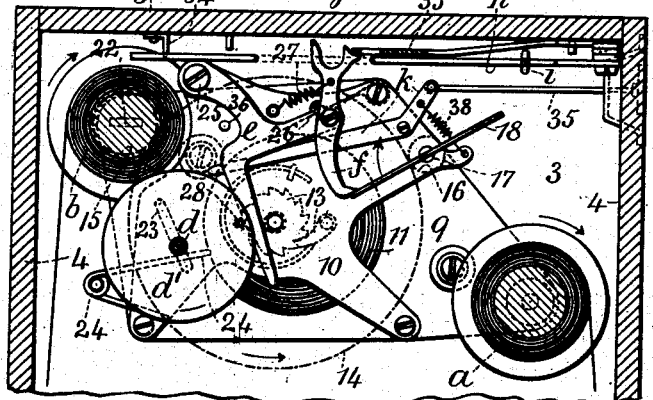
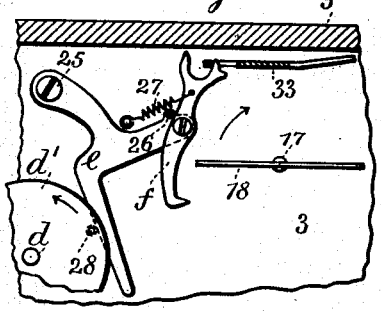
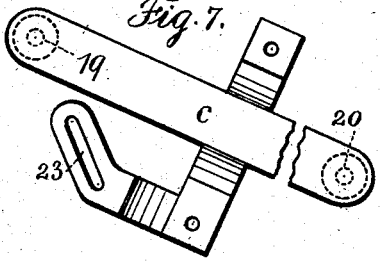
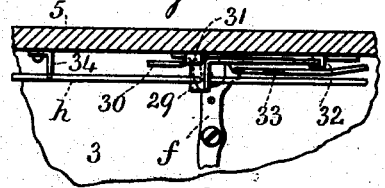
Witnesses
J. Staib
Chas. A. Smith
Inventor:
William D. Macdonald
per L. W. Serrell & Son attys
THE NORRIS PETERS CO., PHOTO-LITHO., WASHINGTON, D. C.

UNITED STATES PATENT OFFICE.

WILLIAM D. MACDONALD, OF NEW YORK, N. Y.

PHOTOGRAPHIC CAMERA.

SPECIFICATION forming part of Letters Patent No. 675,781, dated June 4, 1901.

Application filed August 20, 1900. Serial No. 27,413. (No model.)

*To all whom it may concern:*

Be it known that I, WILLIAM D. MACDONALD, a citizen of the United States, residing at the borough of Manhattan, in the city, county, and State of New York, have invented an Improvement in Photographic Cameras, of which the following is a specification.

Heretofore in photographic cameras it has been usual to supply devices for winding up the sensitive film, which devices were separate and independent of the shutter mechanism, so that it was necessary to perform two operations—the first in making the exposure and the second in winding up the film before making a second exposure—and in these devices a double exposure was quite possible and was only prevented by the studious attention of the photographer.

The object of the present invention is to make unnecessary the manual labor of winding up the film and to relieve the photographer of any thought of the necessity of so doing, so that successive instantaneous exposures can be made with rapidity.

In carrying out my invention I provide a spring-actuated device for positively winding up the film on a spool and devices for controlling the ratio of said movement, means for releasing the devices, and means for actuating the same for stopping the movement when the exposed portion of the film has been drawn away and a fresh portion brought into position. I also provide means for releasing the controlling mechanism actuated by the movement of the shutter and at the end of the shutter movement. I also prefer to employ a device brought into operation in starting the film for correctly placing the same in the camera preparatory to the first exposure, all of which devices are hereinafter more particularly set forth.

In the drawings, Figure 1 is a sectional plan at *x x*, Fig. 2, representing my improvement. Fig. 2 is a vertical section through the case and an elevation of the operative devices. Fig. 3 is a plan of the device employed for releasing the movement in its position after the release has been effected, and Fig. 4 shows the same parts in their position after the winding-up mechanism has started. Fig. 5 is a plan and edge view of the shutter mechanism. Fig. 6 is an elevation and edge view of the same, and Fig. 7 is a plan of a spring-frame in the top of the camera.

The camera-box comprises a top 2, bottom 3, sides 4, front 5, and back 6, and *a* represents a fresh spool of film in place, and *b* a spool of exposed film, the film passing around the rollers 7 8 at opposite corners adjacent to the back of the box and between which rollers the film is stretched where the exposure takes place. The under or lower plate 9 of the movement is secured to the bottom 3 of the box, and the upper plate 10 is supported by pillars upon the under plate in the usual manner of clock-movement mechanism. A spring 11 upon a center arbor, in bearings in the plates 9 and 10, is provided with a winding-nut 12, (shown by dotted lines at the bottom of the box,) which is to be operated by hand to wind up the spring 11, the said spring being held in position in the usual manner by a ratchet and spring-actuated pawl 13. On the center arbor of the spring 11 is a large toothed wheel 14, the same meshing with pinions 15 and 16, the pinion 15 being on an arbor having a flat stud 22, adapted to enter a mortise in the end of the spool upon which the exposed film is wound, motion being communicated to the said spool from the spring 11, toothed wheel 14, and pinion 15. The pinion 16 is on a shaft 17, having bearings in the under and upper plates 9 10, the said shaft projecting above the upper plate and terminating in a fan or blade 18, the rotation of which acts as a governor controlling the movement of the spring 11, wheel 14, and pinion 15, the said pinion 16 meshing with the wheel 14.

I provide a spring-frame *c* of peculiar form. (Shown in perspective elevation in Fig. 2 and by a plan, Fig. 7.) The respective ends of this frame are provided with pivot-pins 19 and 20, adapted to enter the upper ends of the spools of film *a b*, and I provide on the under plate 9 a pivot-pin 21 for the lower end of the spool of film *a*, the said spool *a* being upon the pivots 20 21 and the spool *b* upon the pivot 19 and the stud 22, the fresh spool *a* being free to turn and the spool of exposed film *b* being positively actuated by the winding-up mechanism.

I provide a shaft *d*, having disks *d'* adjacent to the ends of the shaft, and I provide slots 23, one in the frame 10 of the movement and the other in the spring-frame c, said slots receiving the respective reduced ends of the shaft d, and spring-arms 24 are employed, the form of which is shown especially in Figs. 1 and 2, said spring-arms bearing upon the ends of the shaft d and having a tendency to move the shaft along in the slots 23 and hold the peripheries of the disks d' against the outer surface of the spool b of exposed film, so that said disks d' and the shaft d rotate as the spool of exposed film is wound up, and the lower one of said disks d' carries a downward-projecting pin 28.

I provide a bent lever e of peculiar form, (shown especially in Figs. 3 and 4,) and the same is pivoted at 25 to the upper plate 10 of the movement, and to this lever e is pivoted an auxiliary lever f, provided with a fork at one end and a foot at the other end, and the lever e is provided with a stop-pin 26, acting to limit the movement of the auxiliary lever f. A spring 27 is connected to the auxiliary lever adjacent to its forked end, and the other end of the spring is connected to a post secured to the top plate 10 of the movement.

The shutter comprises a shutter-blade g, having stops 31 and 32, and an auxiliary shutter-blade g' overlies the shutter-blade and is pivoted at the same point, the shutter-blade g being perforated and the blade g' being imperforate and in a normal position covering the perforation of the blade g. This auxiliary blade g' is provided with a perforated lug 29 and an arm 30, which arm projects from the left-hand lower end of the blade g', as shown in Fig. 2.

I provide a spring-arm h, passing through the perforated lug 29 of the blade g' and pivoted to the front of the box, and a push-rod i connects with the arm h and extends upward and projects through the top 2 of the camera-box, terminating with a disk adapted to be pushed by the finger. I also provide a plate 34, with a notched edge, (shown in Fig. 6,) and which plate the free end of the arm h is adapted to engage, and a spring-catch 33 is secured to the front of the box and extends along inside of the front and at its free end is provided with an opening adapted to engage the fork at one end of the auxiliary lever f.

I prefer to employ a spring-actuated lever k, (see Fig. 1,) pivoted to the upper plate 10 of the movement, the short end of said lever being connected to a push-rod 35, extending outside of the box and at one side thereof, the long end of said lever being adapted to come into the path of the pin 28 on the lower disk d'.

The foregoing mechanism is operated as follows: To expose the film, the push-rod i is depressed by the finger throwing down the spring-arm h, which in its turn swings the auxiliary shutter-blade g', exposing the true opening in the shutter g. The blade g' moves until it strikes the stop 31. Thereafter the shutter and blade g' move together, bringing the opening in the shutter past the lens, exposing the film, and further moving the shutter g, which is loosely pivoted, to cover the lens. The release of the rod i and arm h causes a return movement to the blade g' in which the blade comes against the stop 32 on the shutter g, covering the opening therein and simultaneously returning the shutter to the normal position. (Shown in Fig. 2.) In this movement and directly after the exposure the arm 30 on the shutter-blade g' strikes against the fork at one end of the auxiliary lever f, moving the same against the spring 27 and the foot end of the lever away from the fan 18 and throwing one point of the fork into engagement with the spring-catch 33, the parts then occupying the position shown in Fig. 3, in which the fan 18 being liberated is rotated by the spring 11 and the toothed wheel 14, the said spring and toothed wheel simultaneously rotating the pinion 15 and the spool of film b in the direction of the arrow and winding up the film on the said spool. The winding-up operation rotates the shaft d and disks d' in contact with spool of the film b. The rotation of the disks d' carries the pin 28 away from contact with the lever e, allowing the spring 27 to draw back the lever e to the position shown in Fig. 4 and against a stop 36. In drawing back this lever the forked end of the auxiliary lever f is drawn out of engagement with the spring-catch 33, and the said auxiliary lever assumes its normal position with reference to the lever e, because the same is pulled by the spring 27 against the stop 26 on the lever e. The levers e and f remain in the position shown in Fig. 4 during one rotation of the disks d' and until the pin 28 comes around and again in contact with the lever e and moves the same outward to bring the foot end of the auxiliary lever f into the path of the rotating fan 18. Consequently when the fan strikes the foot of said lever its movement will be stopped, and with it the rotation of the pinions 16 15 and the toothed wheel 14, as well as the exposed spool of film b. The disks d' are of a circumference equal to the clear distance between the rollers 7 and 8, representing the exposed surface of the film. Consequently when the disks d' have made one complete revolution after the liberation of and before the stopping of the mechanism for winding off the film the exposed portion of the film has been removed from between the rollers 7 and 8 to a position between roller 7 and the spool b, a new portion of film has been brought into place and previously-exposed portions wound upon the exposed spool of film b, and this is accomplished regardless of the amount of exposed film wound upon the spool b, because the shaft d and disks d' yield and are adapted to move with the increased thickness of the exposed spool of film against the action of the spring-arms 24. Consequently one rotation of the disks d' always insures the movement of an equal amount of film. It will thus be seen that the operation of releasing the winding mechanism and stopping the same to wind up the exposed portion of the film is automatically accomplished with the action of the push-rod $i$ and spring-arm $h$ with every operation of the shutter, the said movement being started with the completion of the movement of the shutter and the exposure of the film. The winding-up operation is quickly accomplished, and the shutter returns to its normal position, ready to repeat the operations at short intervals.

The spring 11 is readily wound up by the winding-nut 12 and may be wound repeatedly in order that the proper tension be maintained for quickly winding off the exposed film. The operations hereinbefore described have reference to the instantaneous operation of the shutter, and it is to be understood that the camera-box is constructed to protect the uncovered portions of the film between the spool $a$ and the roller 8 and between the roller 7 and the spool $b$ by suitable partitions or internal frames forming no part of the present invention and not necessarily shown.

Attention is called to the plate 34 with reference to time exposures, in effecting which the push-rod $i$ and the spring-arm $h$ are gradually depressed until the free end of the spring-arm comes into the middle notch of the said rack, at which point the shutter is opened and may be held open for the desired length of exposure, after which the push-rod $i$ is further depressed to complete the movement of the spring-arm and the shutter and release the winding-up mechanism to complete the operations of the camera.

It is to be understood that the camera-box is separable, so that when a film has been entirely exposed and the same, together with the paper backing which is preferably employed, is wound off the spool $a$ onto the spool $b$ the said exposed spool of film may be removed from the camera, a new spool inserted in place of the spool $a$, and the frame of the spool $a$ remaining after unwinding the film and paper is removed from the position shown and placed in the position of the spool $b$ preparatory to connecting to it the free end of the paper from a fresh spool in the usual manner of operating the film.

It will be noticed by reference to Figs. 2 and 7 that the spring-frame $c$ is connected at the center to the top of the camera and that the portions having the pins 19 and 20, forming pivots for the spools $a$ $b$, may be pressed upwardly by hand either to insert a fresh spool at $a$ and remove the frame of the spool or to remove the exposed spool $b$ and insert the frame of the spool in its place, and I provide, as usual, a small window 37 in the back of the camera, of red glass, through which the film-numbers can be progressively seen.

In starting a fresh roll of film it becomes necessary, after connecting the free end of the paper backing with the spool-frame, to progressively move along the paper and the film, so as to bring the first number opposite the window 37. In order to accomplish this, I provide a push-rod 35, having one end extending outside of the camera-box and the other end connected to a lever $k$, pivoted upon the upper plate 10 of the movement. The push-rod 35 is connected to the short end of the lever $k$, and the long arm of said lever is adapted to come into the path of the pin 28 on the lower disk $d'$, and the said lever $k$ is actuated by the spring 38 (shown in Fig. 1) to keep the lever in its normal position. This device is shown in Fig. 1 only for clearness. In the operation of the device the push-rod 35 is moved from the outside and the lever $k$ is swung on its pivot, causing the long arm of the lever to move toward and strike the pin 28, turning the disks $d'$ and shaft $d$ backward, the same sliding upon the surface of the spool $b$. In this backward movement, which is necessarily slight, the levers $e$ and $f$ are released and pulled back by the spring, releasing the fan 18 and allowing to the winding-up mechanism a slight movement. This is repeated until the first number is brought into view at the window 37, at which time the film is properly set for the regular operations of the devices hereinbefore described.

I claim as my invention—

1. In a photographic-film camera, the combination with a shutter mechanism and a spring-actuated winding-up mechanism having a controlling-fan, of the levers $e$ and $f$ pivoted together and to the movement-plate, and a spring for moving the levers in one direction, a rotary device actuated by the winding up of the spool of exposed film, and means connected therewith for releasing the levers and for again moving the same, substantially as set forth.

2. In a photographic-film camera, the combination with a shutter mechanism and a spring-actuated winding-up mechanism having a controlling-fan, of a rotary device actuated by the winding up of the spool of exposed film and a pin connected therewith, a lever $e$ pivoted to the movement-plate and having two portions at approximately right angles to one another, and one of which is adapted to be engaged by the aforesaid pin, a lever $f$ pivoted to the other portion of the lever $e$ and having one end adapted to hold and release the winding-up mechanism, and a spring for actuating both levers in one direction, substantially as set forth.

3. In a photographic-film camera, the combination with a shutter mechanism, and a spring-actuated winding-up mechanism having a controlling-fan, of a rotary device actuated by the winding up of the spool of exposed film and a pin connected therewith, a lever $e$ pivoted to the movement-plate and having two portions at approximately right angles to one another, and one of which is adapted to be engaged by the aforesaid pin, a lever $f$ pivoted to the other portion of the lever $e$ and having one end adapted to hold and release the winding-up mechanism, and a spring for actuating both levers in one direction, and a spring-catch 33 adapted to engage the opposite end of the lever $f$, substantially in the manner and for the purposes set forth.

4. In a photographic-film camera, the combination with a shutter mechanism and a spring-actuated winding-up mechanism having a controlling-fan, of a shaft $d$, disks mounted upon said shaft and agreeing in circumference with the length of the exposed portion of the film-springs for actuating said shaft and disks to hold the disks in contact with the exposed spool of film, and a pin projecting from the lowermost of said disks, a two-part lever pivoted to the frame of the movement and spring-actuated and having a portion adapted to come in contact with the pin of said disk, a portion adapted to stop the fan of the movement, and a portion adapted to come in contact with the shutter in its movement, substantially as and for the purposes set forth.

5. In a photographic-film camera, the combination with a shutter mechanism, and a spring-actuated winding-up mechanism having a controlling-fan, of a lever $e$ pivoted to the movement-plate, an auxiliary lever $f$ pivoted to one end of the lever $e$, a stop on the lever $e$ for the lever $f$, a spring connected to the lever $f$ and to a pin on the movement-plate and adapted to move the levers in one direction, and means substantially as shown and described and interposed between the lever $e$ and the spool of exposed film for releasing the lever $e$ and again moving the same, and means connected to the shutter for operating the lever $f$ to release the winding-up mechanism, substantially as set forth.

6. In a photographic-film camera, the combination with a shutter mechanism and a spring-actuated winding-up mechanism having a controlling-fan, of a lever $e$ pivoted to the movement-plate and having two portions at approximately right angles to one another, an auxiliary lever $f$ pivoted to one portion of the lever $e$ and having at one end a fork and at the other end a foot, a stop on the movement-plate for the lever $e$, and a stop on the lever $e$ for the lever $f$, a spring connected to the lever $f$ at one end and to a pin on the movement-plate at the other end and adapted to move the said levers in one direction, an arm upon the shutter-blade actuated by the movement of the same and adapted to come in contact with the forked end of the lever $f$ to swing the same and move the foot at the other end of said lever out of the path of the fan of the winding-up mechanism to set the same in motion, a spring-catch engaging the forked end of the auxiliary lever to hold the same as moved by the shutter and a device interposed between the other part of the lever $e$ and the exposed spool of film and rotating with said spool of film for releasing the said lever and for again returning the same to its normal position, substantially as set forth.

7. In a photographic-film camera, the combination with a shutter mechanism, and a spring-actuated winding-up mechanism having a controlling-fan, of a lever $e$ pivoted to the movement-plate and having two portions at approximately right angles to one another, an auxiliary lever $f$ pivoted to one portion of the lever $e$ and having at one end a fork and at the other end a foot, a stop on the movement-plate for the lever $e$ and a stop on the lever $e$ for the lever $f$, a spring connected to the lever $f$ at one end and to the pin on the movement-plate at the other end and adapted to move the said levers in one direction, an arm upon the shutter-blade actuated by the movement of the same and adapted to come in contact with the forked end of the lever $f$ to swing the same and move the foot at the other end of said lever out of the path of the fan of the winding-up mechanism to set the same in motion, a spring-catch engaging the forked end of the auxiliary lever to hold the same as moved by the shutter, a shaft $d$, slotted bearings for the shaft at its respective ends, spring-arms for moving the shaft in one direction, disks $d'$ upon said shaft contacting with the exposed spool of film and in circumference agreeing with the length of each exposed portion of the film, and a pin on the lowermost disk contacting with the lever $e$, substantially as and for the purposes set forth.

8. In a photographic-film camera, the combination with a winding-up mechanism for operating the roll of film, of a rotary device acting in connection with the exposed portion of the film and making one revolution with each exposure, a lever actuated by said device, an auxiliary lever pivoted to the aforesaid lever and adapted to release the winding-up mechanism, a spring for actuating the said levers, a shutter $g$ and auxiliary shutter-blade $g'$, and means for operating the same in opposite directions to give the exposure, and an arm on the shutter-blade adapted to come in contact with the aforesaid auxiliary lever to set in motion the winding-up mechanism, substantially as set forth.

9. In a photographic-film camera, the combination with a spring-actuated winding-up mechanism, of a shaft $d$, the disks $d'$, spring-arms for pressing the disks in contact with the exposed spool of film, a lever $k$ spring-actuated in one direction and a push-rod for positively moving the lever in the opposite direction, and means actuated by the movement of said lever for releasing the winding-up mechanism to progressively move the film short distances to bring the same into the proper position in the camera, substantially as set forth.

Signed by me this 16th day of August, 1900.

W. D. MACDONALD.

Witnesses:
GEO. T. PINCKNEY,
S. T. HAVILAND.